United States Patent
Karaburun

(10) Patent No.: US 11,748,974 B2
(45) Date of Patent: Sep. 5, 2023

(54) METHOD AND APPARATUS FOR ASSISTING DRIVING

(71) Applicant: Bayerische Motoren Werke Aktiengesellschaft, Munich (DE)

(72) Inventor: Sinan Karaburun, Beijing (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 689 days.

(21) Appl. No.: 16/756,607

(22) PCT Filed: Nov. 28, 2017

(86) PCT No.: PCT/CN2017/113317
§ 371 (c)(1),
(2) Date: Apr. 16, 2020

(87) PCT Pub. No.: WO2019/104471
PCT Pub. Date: Jun. 6, 2019

(65) Prior Publication Data
US 2020/0262419 A1    Aug. 20, 2020

(51) Int. Cl.
*G06V 10/764* (2022.01)
*G06T 7/246* (2017.01)
(Continued)

(52) U.S. Cl.
CPC ........... *G06V 10/764* (2022.01); *B60W 30/09* (2013.01); *B60W 50/14* (2013.01);
(Continued)

(58) Field of Classification Search
CPC .. B60W 30/09; B60W 50/14; B60W 2420/42; G06T 7/248; G06T 2207/10016;
(Continued)

(56) References Cited

U.S. PATENT DOCUMENTS 9,581,997 B1    2/2017  Penilia et al.
2009/0087085 A1  4/2009  Eaton et al.
(Continued)

FOREIGN PATENT DOCUMENTS

CN    102307769 A    1/2012
CN    104584097 A    4/2017
(Continued)

OTHER PUBLICATIONS

International Search Report (PCT/ISA/210) issued in PCT Application No. PCT/CN2017/113317 dated Sep. 4, 2018 (two (2) pages).
(Continued)

*Primary Examiner* — Michael D Lang
(74) *Attorney, Agent, or Firm* — Crowell & Moring LLP

(57) ABSTRACT

A method and apparatus for assisting driving include: identifying one or more set of video frames from captured video regarding surrounding condition of a vehicle, wherein the one or more set of video frames comprise a moving object; extracting one or more features indicating motion characteristics of the moving object from the one or more set of
(Continued)

100 identifying one or more set of video frames from captured video regarding surrounding condition of a vehicle, wherein the one or more set of video frames comprise a moving object
S110 extracting one or more features indicating motion characteristics of the moving object from the one or more set of video frames
S120 predicting motion intention of the moving object in the one or more set of video frames based on the one or more features
S130 video frames; and predicting motion intention of the moving object in the one or more set of video frames based on the one or more features.

20 Claims, 4 Drawing Sheets

(51) Int. Cl.
  *B60W 30/09* (2012.01)
  *B60W 50/14* (2020.01)
  *G01C 21/34* (2006.01)
  *G01C 21/36* (2006.01)
  *G05D 1/02* (2020.01)
  *G08G 1/01* (2006.01)
  *G06V 20/56* (2022.01)

(52) U.S. Cl.
  CPC ..... *G01C 21/3407* (2013.01); *G01C 21/3453* (2013.01); *G01C 21/3691* (2013.01); *G05D 1/0214* (2013.01); *G05D 1/0246* (2013.01); *G06T 7/248* (2017.01); *G06V 20/56* (2022.01); *G08G 1/0108* (2013.01); *B60W 2420/42* (2013.01); *G05D 2201/0213* (2013.01); *G06T 2207/10016* (2013.01); *G06T 2207/20081* (2013.01); *G06T 2207/30252* (2013.01)

(58) Field of Classification Search
  CPC ........... G06T 2207/20081; G06T 2207/30252; G01C 21/3407; G01C 21/3453; G01C 21/3691; G05D 1/0214; G05D 1/0246; G05D 2201/0213; G08G 1/0108
  See application file for complete search history.

(56) References Cited

U.S. PATENT DOCUMENTS

| | | |
|---|---|---|
| 2010/0205132 A1 | 8/2010 | Taguchi |
| 2011/0313664 A1 | 12/2011 | Sakai et al. |
| 2015/0298621 A1 | 10/2015 | Katoh |
| 2017/0101056 A1 | 4/2017 | Park |
| 2019/0236941 A1* | 8/2019 | Lindsay ............... G08G 1/0112 |

FOREIGN PATENT DOCUMENTS

| | | |
|---|---|---|
| CN | 106740864 A | 5/2017 |
| CN | 107369166 A | 11/2017 |
| DE | 10 2007 049 706 A1 | 4/2009 |
| DE | 10 2016 001 772 A1 | 8/2016 |
| JP | 2008-77624 A | 4/2008 |
| JP | 2008-158640 A | 7/2008 |
| JP | 2011-170762 A | 9/2011 |
| JP | 2012-33075 A | 2/2012 |
| JP | 2014-6776 A | 1/2014 |
| WO | WO 2013/081984 A1 | 6/2013 |

OTHER PUBLICATIONS

Written Opinion (PCT/ISA/237) issued in PCT Application No. PCT/CN2017/113317 dated Sep. 4, 2018 (three (3) pages).
Chinese-language Office Action issued in Chinese Application No. 201780096344.9 dated Sep. 2, 2022 with English translation (21 pages).

* cited by examiner

100

```
identifying one or more set of video frames from captured video regarding
surrounding condition of a vehicle, wherein the one or more set of video frames
comprise a moving object
S110
```

↓

```
extracting one or more features indicating motion characteristics of the moving
object from the one or more set of video frames
S120
```

↓

```
predicting motion intention of the moving object in the one or more set of video
frames based on the one or more features
S130
```

FIG. 1

200 identifying one or more set of training video frames from pre-recorded training video fragments, wherein the one or more set of training video frames comprise a training moving object
S210

determining real motion intention of the training moving object in the one or more set of training video frames
S220

extracting one or more training features indicating motion characteristics of the training moving object from the one or more set of training video frames
S230

predicting motion intention of the training moving object based on the one or more training features extracted from the one or more set of training video frames by utilizing a prediction model
S240

modifying parameters of the prediction model based on the real motion intention and the predicted motion intention
S250

METHOD AND APPARATUS FOR ASSISTING DRIVING

TECHNICAL FIELD

The present disclosure relates to a method and apparatus for assisting driving.

BACKGROUND

Vehicles can be equipped with video capture devices such as cameras to allow for recording of driving scenes. As huge amount of video data is being recorded by the vehicles daily, there is an increasing need for analyzing and interpreting the video data in an efficient way, such that the video data as recorded can be used in assisting driving.

SUMMARY

Embodiments of the present disclosure provide a method and apparatus for assisting driving.

In an aspect of the present disclosure, there is provided a method for assisting driving. The method may comprise identifying one or more set of video frames from captured video regarding surrounding condition of a vehicle, wherein the one or more set of video frames may comprise a moving object; extracting one or more features indicating motion characteristics of the moving object from the one or more set of video frames; and predicting motion intention of the moving object in the one or more set of video frames based on the one or more features.

In another aspect of the present disclosure, there is provided an apparatus for assisting driving. The apparatus may comprise a camera and a processor. The camera may be configured to capture video regarding surrounding condition of a vehicle. The processor may be configured to: identify one or more set of video frames from the video, wherein the one or more set of video frames may comprise a moving object; extract one or more features indicating motion characteristics of the moving object from the one or more set of video frames; and predict motion intention of the moving object in the one or more set of video frames based on the one or more features.

In another aspect of the present disclosure, there is provided a vehicle comprising the apparatus as stated above.

In another aspect of the present disclosure, there is provided a non-transitory computer readable medium comprising instructions stored thereon for performing the method as stated above.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

To describe the technical solutions in the embodiments of the present disclosure or the prior art more clearly, the accompanying drawings used in the description of the embodiments or the prior art are briefly introduced in the following. Evidently, the accompanying drawings are only some embodiments of the present disclosure, and persons of ordinary skill in the art may also obtain other drawings in accordance with these accompanying drawings without creative efforts.

FIG. 1 illustrates a method for assisting driving in accordance with some embodiments of the present disclosure.

FIG. 2 illustrates a method for obtaining a pre-trained prediction model in accordance with some embodiments of the present disclosure.

DETAILED DESCRIPTION

Figure 3:
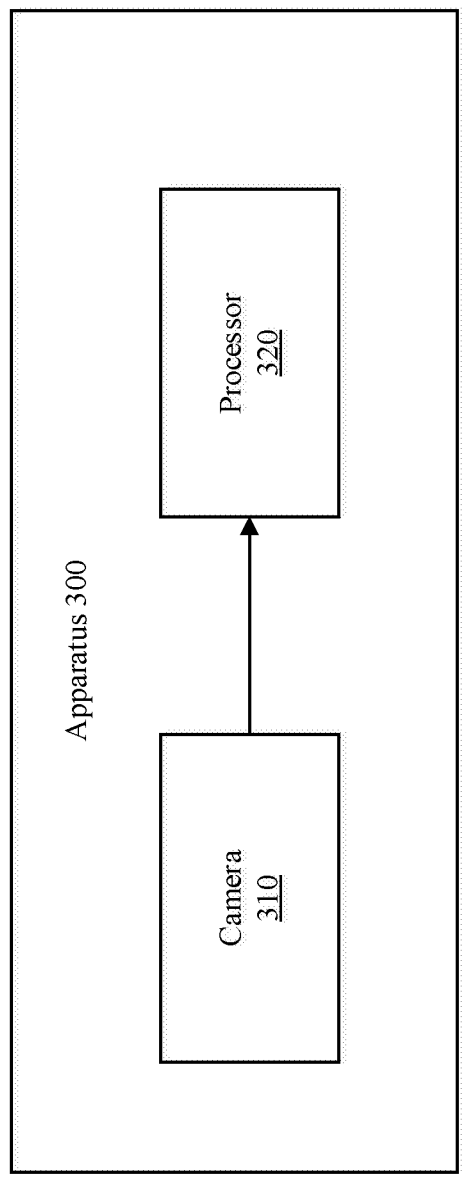
FIG. 3 illustrates an apparatus for assisting driving in accordance with some embodiments of the present disclosure.

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

At the present, vehicles in the traffic can recognize safety related scenes (e.g. overtaking trucks on the highway, cut-in by other vehicles) by using sensors while something is happening. However, the vehicles merely identify the safety risk while something is happening. Intentions of the moving objects (e.g., overtaking trucks, or vehicles which may try to cut-in) are not recognized.

Intention recognition of moving objects in the traffic can support vehicles before something happens. For example, if it is assumed that two trucks (e.g., a first truck and a second truck thereafter) are running on a highway in a lane right to the lane in which a vehicle is now driving. The second truck drives 20 km/h faster than the first truck. The distance between the two trucks is getting shorter. Thus, the intention of the second truck to overtake the first truck raises. The safety risk probability for the driver of the vehicle raises as well, as the second truck may overtake the first truck by getting into the lane in which the vehicle is now running.

If motion intentions of the moving objects in the traffic (e.g., the second truck in the above example) can be predicted, the driving safety of drivers of the vehicle and the trucks will be increased and customer satisfaction will raise accordingly.

In view of the above, in accordance with some embodiments of the present disclosure, there is provided a method and apparatus for assisting driving by predicting motion intentions of moving objects in the traffic.

FIG. 1 illustrates a method 100 for assisting driving in accordance with some embodiments of the present disclosure.

As shown in FIG. 1, the method 100 may comprise identifying at step S110 one or more set of video frames from captured video regarding surrounding condition of a vehicle. The one or more set of video frames may comprise a moving object.

The video may be captured by a video capture device of the vehicle, such as a camera of the vehicle. The video may indicate surrounding condition of the vehicle. The video may comprise a series of video frames. It is noted that some fragments of video as captured may comprise no moving object as there is no moving object around the vehicle and that analyzing of these fragments of video is of no help to assisting driving. Therefore, at this step of the method 100, one or more set of video frames comprising a moving object are identified from the video as captured. Video frames comprising the moving object may be identified by any object recognition method.

In an example, the object recognition method may comprise matching the video as captured with templates for moving objects. The templates may be provided in advance.

In another example, the object recognition method may comprise the following operations: obtaining training images, training an object identification model, and using the model as trained to identify objects in the video as captured. The object identification model may comprise any existing machine learning models or machine learning models developed in the future.

In some embodiments, the moving object may comprise one or more of: a vehicle, a pedestrian, a non-motor vehicle (e.g., a bicycle, a tricycle, an electric bicycle, a disabled motorized wheelchairs, or an animal vehicle etc.), and an animal (e.g., a dog, a cat, a cow, or other animals involved in the traffic).

Upon identifying one or more set of video frames comprising a moving object at step S110, the method 100 may further comprise extracting at step S120 one or more features indicating motion characteristics of the moving object from the one or more set of video frames as identified.

In some embodiments, the one or more features indicating motion characteristics of the moving object may comprise one or more of: velocity of the moving object, moving orientation of the moving object, distance between the moving object and other moving objects in the traffic, distance between the moving object and the vehicle, and acceleration of the moving object.

In some embodiments, features indicating motion characteristics of the moving object may be extracted by analyzing the one or more set of video frames video frames alone or in combination with sensor data of the vehicle.

The method 100 may further comprise predicting at step S130 motion intention of the moving object in the one or more set of video frames based on the one or more features.

In some embodiments, the motion intention may comprise one or more of: crossing road, acceleration, deceleration, sudden stop, cut-in, parking, and overtaking.

In an example, assuming a typical overtaking scene, there are two video frames at time t1 and time t2 (wherein time t2 is after t1) respectively.

In a simplified scenario, a motion intention of overtaking can be determined when the following conditions are satisfied:

(a) the velocity of the moving object M2 (e.g., a second truck) at time t2 is larger than the velocity of the moving object M2 at time t1; and (b) the distance between the moving object M2 and the moving object before M2 (e.g., a first truck) at time t2 is smaller than the distance therebetween at time t1.

The velocity of the moving object and the distance as utilized may have been extracted from the one or more set of video frames as identified and may be indicated by the features as extracted in step S120. In addition, time t1 and time t2 may be timestamps of the video frames.

In a more complicated scenario, a motion intention of overtaking can be determined when additional conditions are satisfied:

(c) the acceleration of the moving object M2 at time t2 is larger than an acceleration threshold; and (d) the distance between the moving object M2 and the moving object before M2 at time t2 is larger than a first distance threshold and smaller than a second distance threshold.

It is noted that the acceleration threshold as well as the first distance threshold and the second distance threshold can be set as required.

It is also noted that the acceleration of the moving object and the distance as utilized may have been extracted from the one or more set of video frames as identified and may be indicated by the features as extracted in step S120. In addition, time t1 and time t2 may be timestamps of the video frames.

In another example, assuming a typical sudden stop scene, there are two video frames at time t1 and time t2 (wherein time t2 is after t1).

In a simplified scenario, a motion intention of sudden stop can be determined when the following conditions are satisfied:

(a) the velocity of the moving object M2 at time t2 is smaller than the velocity of the moving object M2 at time t1; and (b) the distance between the moving object M2 and the moving object before M2 at time t2 is smaller than the distance therebetween at time t1.

It is noted that the velocity of the moving object and the distance as utilized may have been extracted from the one or more set of video frames as identified and may be indicated by the features as extracted in step S120. In addition, time t1 and time t2 may be timestamps of the video frames.

In a more complicated scenario, a motion intention of sudden stop can be determined when additional conditions are satisfied:

(c) the absolute value of the acceleration of the moving object M2 at time t2 is larger than an acceleration threshold; and (d) the distance between the moving object M2 and the moving object before M2 at time t2 is smaller than a distance threshold.

It is noted that the acceleration threshold as well as the distance threshold can be set as required.

It is also noted that the acceleration of the moving object and the distance as utilized may have been extracted from the one or more set of video frames as identified and may be indicated by the features as extracted in step S120. In addition, time t1 and time t2 may be timestamps of the video frames.

In yet another example, assuming a typical cut-in scene, there are two video frames at time t1 and time t2 (wherein time t2 is after t1).

In a simplified scenario, a motion intention of cut-in can be determined when the following conditions are satisfied:

(a) the velocity of the moving object M2 at time t2 is larger than the velocity of the moving object M2 at time t1;

(b) the distance between the moving object M2 and the vehicle at time t2 is smaller than the distance therebetween at time t1; and (c) the moving orientation of the moving object is towards the lane of the vehicle.

It is noted that the velocity of the moving object, the distance and the moving orientation as utilized may have been extracted from the one or more set of video frames as identified and may be indicated by the features as extracted in step S120. In addition, time t1 and time t2 may be timestamps of the video frames.

In a more complicated scenario, a motion intention of cut-in can be determined when additional conditions are satisfied:

(d) the acceleration of the moving object M2 at time t2 is larger than an acceleration threshold; and (e) the distance between the moving object M2 and the vehicle at time t2 is smaller than a distance threshold.

It is noted that the acceleration threshold as well as the distance threshold can be set as required.

It is noted that the acceleration of the moving object and the distance as utilized may have been extracted from the one or more set of video frames as identified and may be indicated by the features as extracted in step S120. In addition, time t1 and time t2 may be timestamps of the video frames.

It should be noted that the interval between the second time t2 and the first time t1 (i.e., Δt) in the above examples can be set as required. For example, Δt can be set as 1 second, 1 minutes or other values as required. In particular, for an interval of 1 s, two video frames in the one or more set of video frames with Δt=1 s will be taken to predict motion intention.

In some embodiments, predicting at step S130 motion intention of the moving object in the one or more set of video frames based on the one or more features may comprise predicting motion intention of the moving object in the one or more set of video frames based on the one or more features by utilizing a pre-trained prediction model.

FIG. 2 illustrates a method 200 for obtaining the pre-trained prediction model in accordance with some embodiments of the present disclosure.

In step S210, one or more set of training video frames are identified from pre-recorded training video fragments. The one or more set of training video frames may comprise a training moving object. The pre-recorded training video fragments may be recorded by cameras of vehicles. Identifying of the one or more set of training video frames may be similar as the identifying in step S110 of method 100. Alternatively, the one or more set of training video frames may be identified by human.

In step S220, real motion intention of the training moving object in the one or more set of training video frames are determined. In a simplified example, the real motion intention of the moving object may be determined by human. Alternatively, the real motion intention may be determined by analyzing the one or more set of training video frames.

In step S230, one or more training features indicating motion characteristics of the training moving object are extracted from the one or more set of training video frames.

The one or more training features indicating motion characteristics of the training moving object may comprise one or more of: velocity of the training moving object, moving orientation of the training moving object, distance between the training moving object and other training moving objects in the one or more set of training video frames, distance between the moving object and the vehicle via which the training video fragments are recorded, and acceleration of the training moving object.

In some embodiments, features indicating motion characteristics of the training moving object may be extracted by analyzing the training video frames alone or in combination with sensor data of the vehicle via which the training video fragments are recorded.

In step S240, motion intention of the training moving object is predicted based on the one or more training features extracted from the one or more set of training video frames by utilizing a prediction model, thereby obtaining the predicted motion intention of the training moving object. In some embodiments, the prediction model may comprise one or more of: generative adversarial networks, auto-encoding variational bayes, and auto-regression model, etc.

In step S250, parameters of the prediction model are modified based on the real motion intention and the predicted motion intention. In particular, the parameters of the prediction model are modified such that the real motion intention is matched with the predicted motion intention.

It is noted that the modification of the parameters of the prediction model may be performed iteratively.

In the predicting phase (e.g., in step S130 of the method 100), the one or more features indicating motion characteristics of the moving object as extracted from the one or more set of video frames are input to the trained prediction model, with output of the trained model being the motion intention of the moving object.

In some embodiments, the method 100 may further comprise prompting driver of the vehicle of the motion intention of the moving object.

For example, the driver of the vehicle can be prompted of the motion intention of the moving object visually, audibly, or haptically. In particular, the driver of the vehicle can be prompted of the motion intention of the moving object by an image displayed on a screen in the vehicle, or by voice played by speakers in the vehicle, or by haptic effects played by tactile elements embedded in the driver's seat, the safety belt or the steering wheel.

In some embodiments, the motion intention can be predicted periodically. Accordingly, the driver of the vehicle can be prompted periodically. The period of the predicting can be set as required.

In some embodiments, the method 100 may further comprise controlling the vehicle based on the predicted motion intention of the moving object, to alleviate or reduce potential influence to the vehicle associated with the motion intention of the moving object.

For example, if it is predicted that the moving object M2 in the previous example has a motion intention of overtaking, the speed of the vehicle can be controlled (e.g., slowed down). Thus, even if the moving object M2 actually overtakes the moving object M1 therebefore and gets into the lane in which the vehicle is running, the vehicle will not be affected significantly. In addition or alternatively, the steering system of the vehicle can be controlled such that the vehicle may switch to another lane before the overtake occurs, thereby alleviating or reducing potential influence to the vehicle by the overtaking of the moving object M2.

In some embodiments, the method 100 may further comprise determining a motion score of the motion intention based on the one or more features.

In an example, the motion score of the motion intention may be calculated based on a simple model constructed as below.

Assuming a typical overtaking scenario, typical values of features indicating motion characteristics (e.g., speed, distance, acceleration, etc.) of the moving object involved in the scenario can be set. In addition, these features can be normalized. Then a vector can be constructed by the features as normalized, thereby obtaining a typical feature vector for the overtaking scenario.

When determining the motion score, the correlation coefficient between a vector constructed by the actual features as extracted and then normalized and the typical feature vector for the overtaking scenario can be calculated. The correlation coefficient as calculated can be used as the motion score.

In another example, the motion score can be calculated by a set of pre-trained prediction models, wherein each model in the set is dedicated for a motion intention.

For a prediction model dedicated for overtaking, in the training phase, the object value for samples with real motion intention being overtaking will be set to 100, while the object value for samples with real motion intention not being overtaking will be set to 0.

It is noted that features indicating motion characteristics of vehicles in the samples may be extracted from the training video frames and may be used as inputs of the prediction model, while output of the prediction model may be used as the predicted output value.

Then parameters of the prediction model is adjusted, in order to reduce the difference between the predicted output value from the model and the object value as set. For example, gradient descent method can be used to train the model, thereby obtaining a trained prediction model.

In the predicting phase, the one or more features indicating motion characteristics of the moving object as extracted from the one or more set of video frames can be input to the trained prediction model for the motion intention, with output of the prediction model being the motion score of the moving object for the motion intention.

It is noted that the method described with respect to the prediction model dedicated for overtaking (i.e., including operations in training phase and in predicting phase) is also applicable to prediction models dedicated for other motion intentions.

With the above operations, a set of motion intentions with corresponding motion scores thereof can be obtained for a moving object.

In some embodiments, the method 100 may further comprise prompting driver of the vehicle of the motion score of the motion intention.

For example, the driver of the vehicle can be prompted of the motion scores visually, audibly, or haptically. In particular, the driver of the vehicle can be prompted of the motion score of the motion intention by an image displayed on a screen in the vehicle, or by voice played by speakers in the vehicle, or by haptic effects played by tactile elements embedded in the driver's seat, the safety belt or the steering wheel.

In addition, the motions scores may be sorted and provided to the driver of the vehicle in an ascending order or in a descending order. For the ascending order, the motion intention with the highest motion score will be provided firstly. For the descending order, the motion intention with the lowest motion score will be provided firstly.

In some embodiments, the mention scores can be calculated periodically. Accordingly, the driver can be prompted periodically. It is also noted that the period for calculating the mention scores can be set as required.

FIG. 3 illustrates an apparatus 300 for assisting driving in accordance with some embodiments of the present disclosure.

As shown in FIG. 3, the apparatus 300 may comprise a camera 310 and a processor 320. The camera 310 may be configured to capture video regarding surrounding condition of a vehicle. The processor 320 may be configured to identify one or more set of video frames from the video, wherein the one or more set of video frames may comprise a moving object; extract one or more features indicating motion characteristics of the moving object from the one or more set of video frames; and predict motion intention of the moving object in the one or more set of video frames based on the one or more features.

In some embodiments, the processor 320 may be further configured to: determine a motion score of the motion intention based on the one or more features.

In some embodiments, in order to predict motion intention of the moving object, the processor 320 may be further configured to: predict motion intention of the moving object in the one or more set of video frames based on the one or more features by utilizing a pre-trained prediction model.

In some embodiments, the pre-trained prediction model may be obtained through the following operations: identifying one or more set of training video frames from pre-recorded video fragments comprising a training moving object; determining real motion intention of the training moving object in the one or more set of training video frames; extracting one or more training features indicating motion characteristics of the training moving object from the one or more set of training video frames; predicting motion intention of the training moving object based on the one or more training features extracted from the one or more set of training video frames by utilizing a prediction model; and modifying parameters of the prediction model based on the real motion intention and the predicted motion intention.

In some embodiments, the processor 320 may be further configured to: prompt driver of the vehicle of the motion intention of the moving object.

In some embodiments, the processor 320 may be further configured to: prompt driver of the vehicle of the motion score of the motion intention.

In some embodiments, the processor 320 may be further configured to: control the vehicle based on the predicted motion intention of the moving object, to alleviate or reduce potential influence to the vehicle associated with the motion intention of the moving object.

Figure 4:
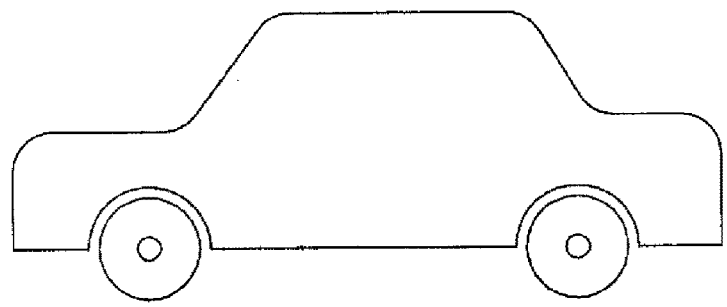
FIG. 4 illustrates a vehicle in accordance with some embodiments of the present disclosure.

FIG. 4 illustrates a vehicle 400 in accordance with some embodiments of the present disclosure. The vehicle 400 may comprise the apparatus 300.

In some embodiments, the camera 310 of the apparatus 300 may be mounted on the top of the vehicle, in order to capture video regarding surrounding condition of the vehicle 400, The processor 320 may embedded in the inside of the vehicle 400.

In accordance with another aspect of the present disclosure, there is provided a non-transitory computer readable medium comprising instructions stored thereon for performing the method 100 or the method 200.

Figure 5:
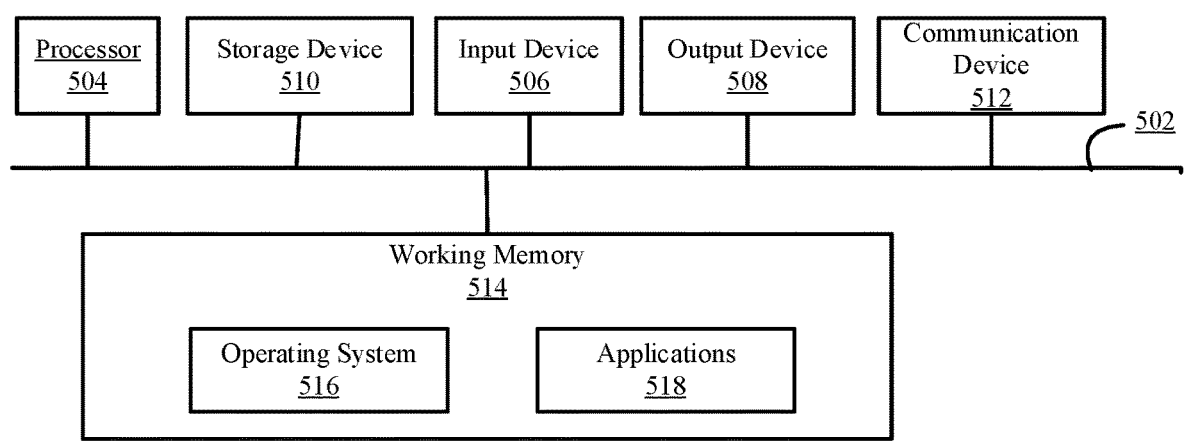
FIG. 5 illustrates a block diagram of computing device which is an example of the hardware device that may be applied to the aspects of the present disclosure in accordance with some embodiments of the present disclosure.

FIG. 5 illustrates a block diagram of computing device which is an example of the hardware device that may be applied to the aspects of the present disclosure in accordance with some embodiments of the present disclosure.

With reference to FIG. 5, a computing device 500, which is an example of the hardware device that may be applied to the aspects of the present disclosure, will now be described. The computing device 500 may be any machine configured to perform processing and/or calculations, may be but is not limited to a work station, a server, a desktop computer, a laptop computer, a tablet computer, a personal data assistant, a smart phone, an on-vehicle computer or any in combination. The aforementioned various apparatuses/server/client device may be wholly or at least partially implemented by the computing device 500 or a similar device or system.

The computing device 500 may comprise elements that are connected with or in communication with a bus 502, possibly via one or more interfaces. For example, the computing device 500 may comprise the bus 502, and one or more processors 504, one or more input devices 506 and one or more output devices 508. The one or more processors 504 may be any kinds of processors, and may comprise but are not limited to one or more general-purpose processors and/or one or more special-purpose processors (such as special processing chips). The input devices 506 may be any kinds of devices that can input information to the computing device, and may comprise but are not limited to a mouse, a keyboard, a touch screen, a microphone and/or a remote control. The output devices 508 may be any kinds of devices that can present information, and may comprise but are not limited to display, a speaker, a video/audio output terminal, a vibrator and/or a printer. The computing device 500 may also comprise or be connected with non-transitory storage devices 510 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 510 may be detachable from an interface. The non-transitory storage devices 510 may have data/instructions/code for implementing the methods and steps which are described above. The computing device 500 may also comprise a communication device 512. The communication device 512 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, Wi-Fi device, WiMAX device, cellular communication facilities and/or the like.

When the computing device 500 is used as an on-vehicle device, it may also be connected to external device, for example, a GPS receiver, sensors for sensing different environmental data such as an acceleration sensor, a wheel speed sensor, a gyroscope and so on. In this way, the computing device 500 may, for example, receive location data and sensor data indicating the travelling situation of the vehicle. When the computing device 500 is used as an on-vehicle device, it may also be connected to other facilities (such as an engine system, a wiper, an anti-lock Braking System or the like) for controlling the traveling and operation of the vehicle.

In addition, the non-transitory storage devices 510 may have map information and software elements so that the processor 504 may perform route guidance processing. In addition, the output device 506 may comprise a display for displaying the map, the location mark of the vehicle and also images indicating the travelling situation of the vehicle. The output device 506 may also comprise a speaker or interface with an ear phone for audio guidance.

The bus 502 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 502 may also include a Controller Area Network (CAN) bus or other architectures designed for application on an automobile.

The computing device 500 may also comprise a working memory 514, which may be any kind of working memory that may store instructions and/or data useful for the working of the processor 504, and may comprise but is not limited to a random access memory and/or a read-only memory device.

Software elements may be located in the working memory 514, including but are not limited to an operating system 516, one or more application programs 518, drivers and/or other data and codes. Instructions for performing the methods and steps described in the above may be comprised in the one or more application programs 518, and the means/units/elements of the aforementioned various apparatuses/server/client device may be implemented by the processor 504 reading and executing the instructions of the one or more application programs 518.

It should also be appreciated that variations may be made in accordance with specific requirements. For example, customized hardware might also be used, and/or particular elements might be implemented in hardware, software, firmware, middleware, microcode, hardware description languages, or any combination thereof. Further, connection to other computing devices such as network input/output devices may be employed. For example, some or all of the disclosed methods and devices may be implemented by programming hardware (for example, a programmable logic circuitry including field-programmable gate arrays (FPGA) and/or programmable logic arrays (PLA)) with an assembler language or a hardware programming language (such as VERILOG, VHDL, C++) by using the logic and algorithm in accordance with the present disclosure.

Although aspects of the present disclosure have been described by far with reference to the drawings, the methods, systems, and devices described above are merely exemplary examples, and the scope of the present disclosure is not limited by these aspects, but is only defined by the appended claims and equivalents thereof. Various elements may be omitted or may be substituted by equivalent elements. In addition, the steps may be performed in an order different from what is described in the present disclosure. Furthermore, various elements may be combined in various manners. What is also important is that as the technology evolves, many of the elements described may be substituted by equivalent elements which emerge after the present disclosure.

What is claimed is:

1. A method for assisting driving comprising:
   identifying one or more set of video frames from captured video regarding surrounding condition of a vehicle, wherein the one or more set of video frames comprise a moving object;
   extracting one or more features indicating motion characteristics of the moving object from the one or more set of video frames; and
   predicting motion intention of the moving object in the one or more set of video frames based on the one or more features.

2. The method according to claim 1, further comprising:
   determining a motion score of the motion intention based on the one or more features.

3. The method according to claim 2, further comprising:
   prompting driver of the vehicle of the motion score of the motion intention.

4. The method according to claim 1, wherein the predicting comprises:
   predicting motion intention of the moving object in the one or more set of video frames based on the one or more features by utilizing a pre-trained prediction model.

5. The method according to claim 4, wherein the pre-trained prediction model is obtained through:
identifying one or more set of training video frames from pre-recorded training video fragments, wherein the one or more set of training video frames comprise a training moving object;
determining real motion intention of the training moving object in the one or more set of training video frames;
extracting one or more training features indicating motion characteristics of the training moving object from the one or more set of training video frames; predicting motion intention of the training moving object based on the one or more training features extracted from the one or more set of training video frames by utilizing a prediction model; and
modifying parameters of the prediction model based on the real motion intention and the predicted motion intention.

6. The method according to claim 5, wherein the prediction model comprises one or more of: generative adversarial networks, auto-encoding variational bayes, and auto-regression model.

7. The method according to claim 1, wherein the one or more features indicating motion characteristics of the moving object comprise one or more of: velocity of the moving object, moving orientation of the moving object, distance between the moving object and other moving objects in the traffic, distance between the moving object and the vehicle, and acceleration of the moving object.

8. The method according to claim 1, wherein the moving object comprises one or more of: a vehicle, a pedestrian, a non-motor vehicle, or an animal.

9. The method according to claim 1, wherein the motion intention comprises one or more of: crossing road, acceleration, deceleration, sudden stop, cut-in, parking, and overtaking.

10. The method according to claim 1, further comprising:
prompting driver of the vehicle of the motion intention of the moving object.

11. The method according to claim 1, further comprising:
controlling the vehicle based on the predicted motion intention of the moving object, to alleviate or reduce potential influence to the vehicle associated with the motion intention of the moving object.

12. A non-transitory computer readable medium comprising instructions stored thereon for performing the method according to claim 1.

13. An apparatus for assisting driving, comprising:
a camera configured to capture video regarding surrounding condition of a vehicle; and
a processor configured to:
identify one or more set of video frames from the video, wherein the one or more set of video frames comprise a moving object;
extract one or more features indicating motion characteristics of the moving object from the one or more set of video frames; and
predict motion intention of the moving object in the one or more set of video frames based on the one or more features.

14. The apparatus according to claim 13, wherein the processor is further configured to:
determine a motion score of the motion intention based on the one or more features.

15. The apparatus according to claim 14, wherein the processor is further configured to:
prompt driver of the vehicle of the motion score of the motion intention.

16. The apparatus according to claim 13, wherein in order to predict motion intention of the moving object, the processor is further configured to:
predict motion intention of the moving object in the one or more set of video frames based on the one or more features by utilizing a pre-trained prediction model.

17. The apparatus according to claim 16, wherein the pre-trained prediction model is obtained through:
identifying one or more set of training video frames from pre-recorded video fragments comprising a training moving object;
determining real motion intention of the training moving object in the one or more set of training video frames;
extracting one or more training features indicating motion characteristics of the training moving object from the one or more set of training video frames;
predicting motion intention of the training moving object based on the one or more training features extracted from the one or more set of training video frames by utilizing a prediction model; and
modifying parameters of the prediction model based on the real motion intention and the predicted motion intention.

18. The apparatus according to claim 13, wherein the processor is further configured to:
prompt driver of the vehicle of the motion intention of the moving object.

19. The apparatus according to claim 13, wherein the processor is further configured to:
control the vehicle based on the predicted motion intention of the moving object, to alleviate or reduce potential influence to the vehicle associated with the motion intention of the moving object.

20. A vehicle, comprising the apparatus according to claim 13.

* * * * *